US005767841A

United States Patent [19]
Hartman

[11] Patent Number: 5,767,841
[45] Date of Patent: Jun. 16, 1998

[54] TWO-SIDED TRACKBALL

[76] Inventor: William M. Hartman, 600 S. Dearborn St., #1405, Chicago, Ill. 60605

[21] Appl. No.: 595,199

[22] Filed: Feb. 1, 1996

Related U.S. Application Data

[63] Continuation-in-part of Ser. No. 45,950, Nov. 3, 1995.
[51] Int. Cl.$^6$ .............................. G01V 9/04; G06F 3/033
[52] U.S. Cl. ........................................................ 345/167
[58] Field of Search .................................. 345/156, 157, 345/158, 164, 167, 172, 184; 348/734

[56] References Cited

U.S. PATENT DOCUMENTS

| | | | |
|---|---|---|---|
| D. 326,261 | 5/1992 | Ashmun et al. | |
| D. 346,152 | 4/1994 | Zaugg | D13/168 |
| D. 350,736 | 9/1994 | Takahashi et al. | D14/114 |
| D. 352,930 | 11/1994 | Tsuji | D13/168 |
| D. 366,876 | 2/1996 | Labohm | D14/218 |
| D. 367,061 | 2/1996 | Davidson | D14/218 |
| D. 368,080 | 3/1996 | Aeschbacher et al. | D14/114 |
| D. 368,475 | 4/1996 | Scott | D14/218 |
| 4,562,347 | 12/1985 | Hovey et al. | 250/221 |
| 5,008,528 | 4/1991 | Duchon | |
| 5,122,654 | 6/1992 | Koh et al. | 250/221 |
| 5,280,276 | 1/1994 | Kwok | 345/167 |
| 5,287,090 | 2/1994 | Grant | 345/163 |
| 5,428,368 | 6/1995 | Grant | |
| 5,457,479 | 10/1995 | Cheng | |
| 5,491,497 | 2/1996 | Suzuki | 345/157 |
| 5,543,821 | 8/1996 | Marchis et al. | 345/167 |
| 5,565,889 | 10/1996 | Crooks | 345/157 |
| 5,566,087 | 10/1996 | Voigt et al. | 364/505 |
| 5,572,237 | 11/1996 | Crooks et al. | 345/156 |

OTHER PUBLICATIONS

"Hot Buttons", The International Design Magazine, May Jun. 1995, pp. 56–59.
"You've got questions. We've got answers", RadioShack 1996 Catalog, publication date believed to be 1995, p. 207.
MicroWarehouse catalog, publication date believed to be 1995, pp. 121–123.
"Compact Disc–Interactive", Brochure by Philips, publication date unknown.
Pioneer Premier Remote Control published Jan., 1994 in Audio Video Int'l, p. 35.
Phillips CD–1 Remote published Aug., 1994 in Video Magazine, p. 32.
Audio Video Intl Jan. 1994 p. 35, Pioneer Premier Remote Control.
Video Magazine Aug. 1994 p. 32 Phillips CD–1 Remote.

*Primary Examiner*—Mark R. Powell
*Assistant Examiner*—Vincent E. Kovalick
*Attorney, Agent, or Firm*—Brinks Hofer Gilson & Lione; Craig A. Summerfield

[57] ABSTRACT

A hand-held, double sided trackball apparatus for controlling a cursor has a housing with a first side and a second side, and a third side extending between and joining the first and second sides. The third side has an inset portion for placement of the tip of an index finger of either hand. Each of the first and second sides has an aperture. A ball is rotatably mounted in the housing so that the ball is exposed in the first and second apertures. The trackball apparatus is usable in the left or the right hand of a user. First and second buttons, connected to a single electrical circuit, are on the first and second side, respectively, of the housing.

21 Claims, 1 Drawing Sheet

TWO-SIDED TRACKBALL

CROSS-REFERENCE TO RELATED APPLICATION

The present application is a continuation-in-part of application Ser. No. 29/045,950, filed Nov. 3, 1995, the disclosure of which is hereby incorporated by reference.

BACKGROUND OF THE INVENTION

The present invention relates to cursor control devices. More particularly, the present invention relates to a two-sided trackball remote control apparatus for the navigation of interactive television or the manipulation of any graphical user interface.

Interactive television will allow users to both view television programs and to input control and feedback information. Interactive television is capable of two-way communication. Expected interactive television services include: multimedia peer-to-peer communication; access to music, movie and television archives; text, voice, and video-phone services; home shopping in virtual malls; access to library databases; news, weather, and financial information; interactive education and entertainment; and communication in virtual communities.

Selections among these many services and among the many choices within each service will be made through a television. Current cable box manufacturers list the available shows and services for selection with a standard remote control. The already complex multiple buttoned remote controls limit the flexibility of the overall system, demanding that users take a substantial amount of time to find the correct button or series of buttons to select a service or program.

An alternative for selecting the many services would be the use of a standard computer mouse or trackball. However, such a device requires a cord connection to the cable box. A mouse requires a flat surface, which takes up room. Current trackballs and computer mice are not designed for convenient hand-held use with television programming and selection.

SUMMARY OF THE INVENTION

The present invention is a hand-held, double sided trackball apparatus for controlling a cursor and making program choices on a television or interactive television. The double-sided trackball has a housing with first and second sides. Each of the first and second sides has an aperture. A ball is rotatably mounted in the housing and exposed in both the first and second apertures. Dual buttons, connected to a single electrical circuit, are positioned on the two sides of the housing.

In another aspect of the invention, the trackball apparatus is usable in either the left or right hand of a user by turning it over. A housing has opposed first and second sides, and a third side extending between and joining the first and second sides. The first and second sides each have the aperture for the ball, and the third side has an inset portion for grasping by either hand.

In yet another aspect of the instant invention, a hand-held remote control apparatus for transmitting control information is provided. A two-sided trackball controller has a housing with first and second sides. Each of the first and second sides has an aperture with a ball rotatably mounted within both the first and second side aperture.

It is to be understood that both the foregoing general description and the following detailed description are exemplary and are intended to provide further explanation of the invention claimed. These and other advantages of the invention, as well as the preferred embodiments, will be best understood by reference to the attached drawings.

DETAILED DESCRIPTION OF THE PRESENTLY PREFERRED EMBODIMENTS

Figure 1:
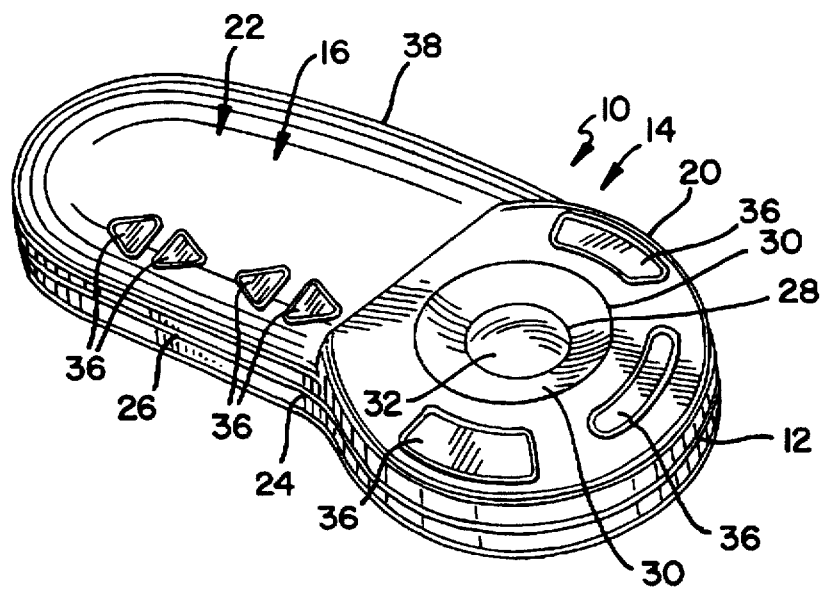
FIG. 1 is a perspective view of a double-sided hand held trackball controller.

Referring now to the drawings, a double-sided hand-held trackball device, generally shown at 10, is represented in FIG. 1. The trackball 10 may be used as a stand-alone component or in conjunction with other components in an interactive television system, like a laptop screen (not shown). The hand-held trackball 10 is meant for use with a television (not shown) and a set-top box (also not shown). The hand-held trackball 10 transmits control information to the set-top box or any other receiving device via an infrared transmitter 12, as is known in the art.

Figure 2:
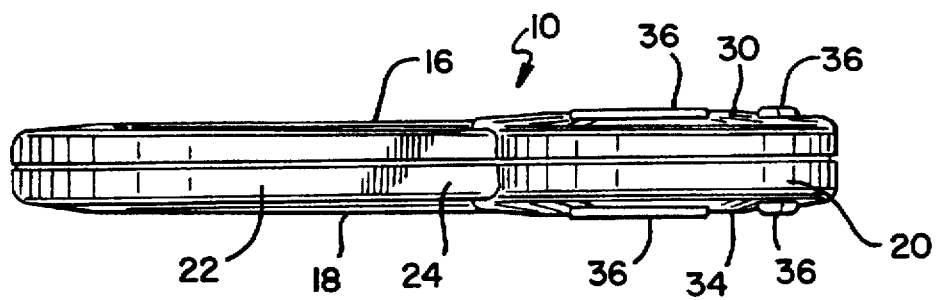
FIG. 2 is a side view of the double-sided hand held trackball of FIG. 1.

The hand-held trackball 10 has a housing generally shown at 14. The housing is preferably made of injection molded ABS plastic. Referring now to both FIGS. 1 and 2, the housing 14 has a left handed side 16 and a right handed side 18. The left handed side 16 and the right handed side 18 are mirror images of each other and are on opposing sides of the housing 14. For brevity, generally the left hand side 16 will be discussed. It is understood that the discussion also applies to the mirror image right hand side 18.

The housing 14 has a generally circular portion 20 connected to one end of an oblong portion 22. The diameter of the circular portion 20 is preferably greater than the width of the oblong portion 22. The circular portion 20 connects to the oblong portion 22 off-center from the lengthwise centerline of the oblong portion 22 so that an inset portion 24 is created on a fingertip side 26 of housing 14.

Within the circular portion 20 is an aperture 28. Surrounding aperture 28 is an indention 30 which is indented from the most outward portion of the left hand side 16, a raised circular ridge 30. The raised circular ridge 30 defines a conceptual plane that is the most outward plane of left hand side 16 of the housing 14.

A ball 32 is rotatably mounted within the housing 14. The ball 32 is exposed in the aperture 28 so that the ball may be manipulated by the thumb of a user. The controller 10 comfortably fits in an average user's hand, so the distance from the edge 38 to the ball 32 is about the length of an average person's thumb. The same ball 32 is also exposed on the right handed side 18 of housing 14 for manipulation, in the alternative, by the right thumb of a user. Preferably, the ball is made from a smooth, hard ABS plastic, as is known in the art. Preferably, the ball 32 is as large as possible, to give the user accurate control during use. However, the ball 32 size is limited to avoid adding too much weight or necessitating a larger trackball device 10 which would not comfortably fit in an average user's hand. The diameter of ball 32 is less than the distance from the raised outer ridge 30 on the left handed side 16 to the raised outer ridge 34 on the right handed side 18. The ball 32 is mounted within housing 14 so that no portion of the ball's 32 surface extends beyond the housing 14, as defined by the conceptual planes created by raised ridges 30 and 34.

Within the housing 14 are X and Y casters that contact the ball 32 and detect rotation of the ball 32, as is known in the art. Preferably, the X and Y casters have a tactile surface for gripping the ball 32 as it rotates. A third spring loaded idler caster is provided to support and hold ball 32 against the X and Y casters. Ball 32 movement is converted into control information to be transmitted by the infrared transmitter 12. The structure and operations of these internal mechanisms are known in the art. The resulting information transmitted by transmitter 12 consists of two-dimensional control instructions for guiding the cursor on a screen.

Power for operation of controller 10 is provided by two AA batteries. Preferably, the batteries are housed within the housing 14. As is known in the art, a snap-fit access plate positioned on the oblong portion 22 allows changing of the batteries.

On both the left handed side 16 and right handed side 18 of housing 14 are multiple buttons 36. The buttons 36 on the left hand side 16 mirror the buttons on the right hand side 18. For each function controlled by a button 36, such as volume up, a button 36 is on both the left hand side 16 and the right hand side 18. When a particular button 36 is pressed an electrical signal, as is known in the art, is created so that transmission of that particular control information is carried out by infrared transmitter 12. Thus, two buttons 36 are provided for each control function. Preferably placed on each side of the circular portion 20 are three buttons 36 spaced outwardly of the ball 32 for convenient access by the thumb of a user. Adjacent to the fingertip side 26 on the oblong portion 22 are placed four buttons 36. Buttons 36 may correspond to any particular control function desirable. Preferably, the buttons 36 adjacent the ball 32 include a menu button which toggles through program specific controls, a select button for selecting a particular function based on cursor position, and a mute button which also serves as an on/off button. Preferably, the four buttons 36 adjacent the fingertip side 26 correspond to increasing and decreasing volume respectively and to adjusting the picture on the T.V. monitor by increasing and decreasing brightness and contrast at the same time.

To use the double sided hand-held trackball 10 a left handed user would place the left thumb on the left hand side 16 and curl the fingers around the right hand side 18 so that the fingertips of an average user curl up and are adjacent to the fingertip side 26. A right handed user would place the right thumb on the right handed side 18 and curl the fingers around the left hand side 16 placing the fingertips adjacent to the fingertip side 26. The fingertips rest along the oblong portion 22 of the housing 14. The inset portion 24 of the fingertip side 26 receives the tip of the index finger. Thus, the inset portion 24 acts to orient the hand in a particular position. By orienting the hand in this position, the thumb is then in the most optimum place to control the various functions of the hand-held trackball 10.

Without the need for any supporting surface, the user may then manipulate ball 32 with the thumb. The rotation of ball 32 causes the sensors within the housing 14 to create and the transmitter 12 to transmit cursor control information based on movement of ball 32. The user also can press any of the various buttons 36 desired with the user's thumb. Due to the orientation of the buttons 36 adjacent the fingertip side 26, the user may easily and comfortably press these buttons 36 with the thumb. With the buttons 36 adjacent the ball 32 and ball 32 in the circular portion 20, the user has access to all control functions with a simple movement of the thumb. Using this hand-held trackball controller 10, both left handed and right handed users can comfortably control an interactive television setup or any other controllable device capable of use with a two dimensional control. Alternatively, a user could manipulate the ball 32 with the index finger.

Of course, it should be understood that a wide range of changes and modifications can be made to the preferred embodiment described above. Thus, it is intended that the foregoing detailed description be regarded as illustrative rather than limiting. It is the following claims, including all equivalents, which are intended to define the scope of this invention.

I claim:

1. A hand-held, double sided trackball apparatus for controlling a cursor, the apparatus comprising:
 a) a housing having a first side and a second side, each of the first and second side having an aperture;
 b) a ball rotatably mounted in the housing, the ball being exposed in the first and second apertures; and
 c) at least a first and second button connected to a single electrical circuit, the first button being on the first side and the second button being on the second side of said housing.

2. The apparatus of claim 1 wherein:
 a) the first button is adjacent the ball; and
 b) third and forth buttons are on the first side and adjacent the ball.

3. The apparatus of claim 2 wherein:
 a) the second button is adjacent the ball; and
 b) fifth and sixth buttons are on the second side and adjacent the ball.

4. The apparatus of claim 2 wherein:
 a) the housing has a third side;
 b) at least four buttons are on the first side, the four buttons being adjacent the third side.

5. The apparatus of claim 3 wherein:
 a) the housing has a third side;
 b) at least four buttons are on the second side, the four buttons being adjacent the third side.

6. The apparatus of claim 1 wherein:
 a) the first and second side each having an outward most plane; and
 b) the ball is inwardly of the first and second side outward most planes.

7. The apparatus of claim 6 wherein:
 a) the first and second side each has an indention; and
 b) the first and second side apertures are within the first and second side indentions.

8. The apparatus of claim 7 wherein both the first and second side most outward planes are defined by raised circular surfaces surrounding each of the first and second side apertures.

9. A handed hand-held trackball apparatus for controlling a cursor, the apparatus comprising:
 a) a housing having opposed first and second sides, the housing having a third side extending between and joining the first and second sides, the first and second side each having an aperture, and the third side having an inset portion; and
 b) a ball rotatably mounted in the housing and having a surface, the ball surface being exposed in the first and second side apertures.

10. The apparatus of claim 9 wherein:
 a) the housing has a center line on both the first and second sides parallel to a longest dimension of said housing; and b) the first and second side apertures are offset from the long center line.

11. The apparatus of claim 10 wherein:

a) each of the first and second sides has a circular portion and an oblong portion, each oblong portion having first and second ends, and the circular portion being adjacent the first end;

b) the first and second side apertures are located in the circular portion; and c) the inset portion is defined by where the circular portion connects to the oblong portion.

12. The apparatus of claim 11 wherein the first and second side apertures are centered in the first and second side circular portions.

13. The apparatus of claim 9 wherein the inset portion is shaped to allow the thumb of a user to reach the first side aperture and to allow the index finger of a user to reach the inset portion.

14. The apparatus of claim 13 wherein a first intersection of the inset portion with the first side is an equal distance to the first side aperture as a second intersection of the inset portion with the second side is to the second side aperture.

15. The apparatus of claim 9 wherein the inset portion is shaped to receive an index finger and to align the thumb of the user so that ball is at the tip of the user's thumb.

16. The apparatus of claim 15 wherein the first side is oriented upward for use in the left hand of a user and, alternatively, the second side is oriented upward for use in the right hand of a user.

17. A hand-held remote control apparatus for transmitting control information, the apparatus comprising:

a) a two-sided trackball controller having a housing, the housing having first and second sides, each side having an aperture; and b) a ball rotatably mounted within both the first and second side apertures.

18. The apparatus of claim 17 wherein the housing is shaped so that when the controller is used in a right hand of a user, the second side is used by the thumb of the user, and when the controller is used in the left hand of a user, the first side is used by the thumb of the user.

19. The apparatus of claim 18, wherein:

a) the housing has a third side, the third side having an inset portion; and b) the inset portion is shaped so that the finger tips of a user fit against the inset portion whether the apparatus is used in the left or right hand of the user.

20. The apparatus of claim 19, wherein each of the first and second sides has at least one button.

21. The apparatus of claim 20 wherein the first and second sides have shapes that are mirror images of one another.

* * * * *